(12) United States Patent
Wang et al.

(10) Patent No.: US 10,630,508 B2
(45) Date of Patent: Apr. 21, 2020

(54) DYNAMIC CUSTOMER VLAN IDENTIFIERS IN A TELECOMMUNICATIONS NETWORK

(71) Applicant: Level 3 Communications, LLC, Broomfield, CO (US)

(72) Inventors: Jin-Gen Wang, Lafayette, CO (US); Michael L. Nyhus, Denver, CO (US); Austin D. Ritchie, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/176,792

(22) Filed: Oct. 31, 2018

(65) Prior Publication Data
US 2019/0132152 A1 May 2, 2019

Related U.S. Application Data

(60) Provisional application No. 62/579,704, filed on Oct. 31, 2017.

(51) Int. Cl.
*H04L 12/28* (2006.01)
*H04L 12/46* (2006.01)
*H04L 12/715* (2013.01)

(52) U.S. Cl.
CPC ........ *H04L 12/4645* (2013.01); *H04L 12/462* (2013.01); *H04L 12/4633* (2013.01); *H04L 45/64* (2013.01)

(58) Field of Classification Search
CPC .......... H04L 45/52; H04L 45/66; H04L 12/46
USPC .......................................... 370/401–403, 465
See application file for complete search history.

(56) References Cited

U.S. PATENT DOCUMENTS

| | | | |
|---|---|---|---|
| 7,701,948 B2* | 4/2010 | Rabie | H04L 47/10 370/395.41 |
| 8,806,606 B2* | 8/2014 | Ahmad | H04L 41/5054 726/11 |
| 10,153,943 B2* | 12/2018 | Mulligan | G06F 9/45533 |
| 10,200,212 B2* | 2/2019 | Song | H04L 12/4654 |
| 10,205,682 B2* | 2/2019 | Uttaro | H04L 12/4641 |
| 2008/0310430 A1* | 12/2008 | He | H04L 12/462 370/400 |

* cited by examiner

*Primary Examiner* — Dmitry Levitan (57) ABSTRACT

A method for transmitting data over networks includes associating Customer Edge Virtual Local Area Network (CE-VLAN) identifiers with an Ethernet Virtual Connection (EVC). Each of the CE-VLAN identifiers is assigned to a respective Virtual Private Cloud (VPC) of a cloud computing environment and the EVC extends between a first network and the cloud computing environment through a second network. The EVC is also configured to transmit packets including any of the CE-VLAN identifiers to the cloud computing environment. The method further includes transmitting a packet received from the first network and including one of the CE-VLAN identifiers to the cloud computing environment using the EVC.

7 Claims, 8 Drawing Sheets

DYNAMIC CUSTOMER VLAN IDENTIFIERS IN A TELECOMMUNICATIONS NETWORK

CROSS-REFERENCE TO RELATED APPLICATIONS

This application is related to and claims priority under 35 U.S.C. § 119(e) from U.S. Patent Application No. 62/579,704, filed Oct. 31, 2017, titled "DYNAMIC CUSTOMER VLAN IDENTIFIERS IN A TELECOMMUNICATIONS NETWORK," the entire content of which is incorporated herein by reference for all purposes.

TECHNICAL FIELD

Aspects of the present invention generally relate to systems and methods for implementing a telecommunications network, and more specifically for exchanging traffic between a network and multiple virtual resources of a cloud environment over the telecommunications network using a single connection.

BACKGROUND

Telecommunication or other types of computer networks provide for the transmission of information. Such information may involve voice, data, multimedia information, software (including patches and updates), and various other forms of digital content, and digital services, among many other things. In addition, telecommunication networks often offer features and/or services to the customers of the network that provide flexible and varied ways in which the communications are transmitted over the network. For example, some telecommunication networks provide Internet access to its customers, long distance voice capabilities, high definition audio and/or video communication capabilities, and the like. In other examples, the telecommunication network may be utilized to provide connectivity to one or more cloud-based resources offered by a third party. In other words, customers or other users may purchase, acquire, or otherwise obtain permission to use resources of a public and/or private cloud service to virtualize one or more of processes and connect to such resources through a telecommunications network.

Users may purchase or otherwise have access to multiple resources from a public and/or private cloud service accessible through a telecommunications network. For example, a customer may purchase a group of resources (such as data storage resources, processing resources, security resources, and the like) with each resource being acquired for a different purpose, such as development, testing, and manufacturing. Accordingly, it is generally desirable that access to each cloud instance makes efficient use of network resources and any services for exchanging data with the cloud-based resources that may be purchased by or otherwise provided to the customer.

It is with these observations in mind, among others, that aspects of the present disclosure were conceived.

SUMMARY

In one aspect of the present disclosure, a method for transmitting data over networks is provided. The method includes associating Customer Edge Virtual Local Area Network (CE-VLAN) identifiers with an Ethernet Virtual Connection (EVC). Each of the CE-VLAN identifiers is assigned to a respective Virtual Private Cloud (VPC) of a cloud computing environment and the EVC extends between a first network and the cloud computing environment through a second network. The EVC is also configured to transmit packets including any of the CE-VLAN identifiers to the cloud computing environment. The method further includes transmitting a packet received from the first network and including one of the CE-VLAN identifiers to the cloud computing environment using the EVC.

In another aspect of the present disclosure, a system for configuring network devices is provided. The system includes a network controller in communication with a first network. The network controller is adapted to establish a connection through the first network between a second network and a cloud computing environment. The cloud computing environment includes resources, each of which is associated with a respective resource identifier. The connection established by the network controller is adapted to carry traffic between the second network and the cloud computing environment for each of the resources. The network controller is further adapted to configure network devices of the first network to receive packets from the second network including any of the resource identifiers and to route packets including any of the resource identifiers through the connection to the cloud computing environment.

In yet another aspect of the present disclosure, a method for communicating data through networks is provided. The method includes receiving a packet for one of multiple resources of a computing system, each of the resources being associated with a respective first identifier, and the computing system being in communication with a network. In response to identifying the packet includes one of the first identifiers, a second identifier is inserted into the packet, the second identifier associated with a connection established through the network for handling packets for each of the resources. The packet is routed through the network and along the connection according to the second identifier and then transmitted from the network to the computing system according to the first identifier associated with the resource.

DETAILED DESCRIPTION

Aspects of the present disclosure involve systems, methods, computer program products, and the like, for facilitating communication with cloud-based platforms. More particularly, systems and methods disclosed herein facilitate efficient communication between computing systems or networks through an intermediate network. In one example, the computing systems/networks may be a first network corresponding to a customer and a second computing environment that is a cloud-based platform including multiple virtual resources accessible using a computing device, such as a computing device of a customer who acquires or otherwise obtains access to the resources of the cloud-based platform. In contrast to conventional methods in which a separate connection through the intermediate network is required for each virtual resource, implementations of the present disclosure enable communications between one or more devices of the first network and multiple cloud resources over a single connection extending through the intermediate network.

It should be appreciated that for purposes of the present disclosure, the term "customer" is used to refer to any entity that may operate one or more computing systems and/or networks that communicate, at least in part, with a second computing system or network through a telecommunications network. Also for purposes of the present disclosure, the telecommunications network over which such communications are exchanged between the customer network and one or more cloud environments is generally referred to herein as a "intermediate" or "service provider" network. In each case, the terms customer, intermediate, or service provider are used solely for clarity and should not be construed as limiting. For example, to the extent the terms "customer network" and "intermediate network" are used herein, each such term should be more generally considered to refer to any network carrying out the functions described herein.

Communication between a customer network and a virtual cloud-based resource may include establishing an Ethernet Virtual Connection (EVC) between the customer network and the virtual cloud-based resource. In conventional systems, connecting the customer network with multiple virtual resources associated with the customer and maintained in a given cloud environment may require separate EVCs for each virtual resource and, as a result, a corresponding dedication of network resources for maintaining each EVC. Under this conventional approach, network resources may be tied up for purposes of maintaining each EVC to its respective virtual resource even when each EVC is not in use. Accordingly, a customer may pay for transport services that go under- or unutilized and limited resources of the network may be inefficiently allocated and not otherwise available for other uses.

The foregoing issues, among others, are addressed in implementations of the present disclosure by enabling communication between a customer network and multiple virtual resources, such as Virtual Private Clouds (VPCs), of a cloud environment over a single EVC. Packets received from a customer network destined for a VPC generally include an identifier, such as a Customer Edge Virtual Local Area Network (CE-VLAN) identifier, which is uniquely associated with one of the VPCs. In one implementation of the present disclosure, when such packets are received by a first edge device of an intermediate network, a second identifier, such as a Service Provider Virtual Local Area Network (SP-VLAN) identifier, is added to the packet. The SP-VLAN identifier is associated with an EVC that extends through the intermediate network such that components of the intermediate network route packets including the SP-VLAN identifier through the intermediate network to a second edge device using the associated EVC. When the packet reaches the second edge device, the SP-VLAN identifier is removed and the packet is passed to the cloud environment for further processing and routing to the destination VPC in accordance with the CE-VLAN identifier.

The foregoing approach may be used for packets destined for each of multiple VPCs maintained by the cloud environment. In other words, each packet intended for any VPC maintained by a given cloud environment may be supplemented with a SP-VLAN identifier that causes each packet to be routed over a common EVC. The identifier may then be removed prior to the packet reaching the cloud environment such that each packet is ultimately routed to the correct VPC in accordance with its respective CE-VLAN identifier.

In one implementation, an administrator of other user associated with a customer may dynamically assign or unassign CE-VLAN identifiers to existing EVCs. For example, a user portal may be provided to enable addition or removal of CE-VLAN identifiers to EVCs associated with the customer. The portal may, in some instances, communicate with a network controller or components of the intermediate network through which the EVC extends to update routing information or otherwise configure components of the intermediate network in accordance with the updated assignments. For example, such configuration may include mapping a provided CE-VLAN identifier to a second identifier, such as the previously discussed SP-VLAN identifier, that is used for routing packets through the intermediate network using the EVC. Through the systems and methods described, a customer may better utilize bandwidth of an EVC connecting the customer to a cloud environment while maintaining the separation of VPCs within the cloud environment.

In addition to economic benefits to customers associated with making better use of provisioned services, the systems and methods disclosed herein also provide significant technical advantages for the intermediate network. As previously noted, under conventional approaches, communication between a first computing system (e.g., a customer network) and multiple resources of a cloud-based or similar platform through an intermediate network generally requires individual connections for each resource and dedication of corresponding network resources to support each connection. In contrast, the systems and methods disclosed herein require only enough resources to support a single connection over the intermediate network. As a result, resources that would otherwise be used to support additional connections may be used for other purposes.

Additionally, communicating over a single connection provides more efficient use of the resources dedicated to supporting the connection. For example, in conventional systems including multiple connections, each connection is generally provisioned to handle a certain maximum level of traffic. However, traffic for a given connection may only be at or near the maximum level at certain times of the day or week (e.g., when performing a nightly or weekly update) while having relatively low traffic at other times. As a result, the total capacity of the connections for such resources (either individually or collectively) is significantly underutilized. In contrast, by using a single connection for multiple resources and by coordinating/scheduling known periods of high traffic, the capacity of the single connection may be more efficiently utilized. For example, updates or similar high traffic processes for one or more first resources may be scheduled to occur during relatively low periods of traffic for one or more second resources (and vice versa) such that the combined traffic is within the capacity of the connection.

Although described herein as primarily being directed to communications originating from a customer network and intended for resources of a cloud computing environment, it should be appreciated that the techniques described herein may be applied more generally to communications between a source computing system or network and multiple resources of a destination computing system or network using a single connection through an intermediate network. In one implementation, packets originating in the cloud environment may be directed to multiple resources associated with a customer using similar techniques as described above for transmitting packets form the customer network to the resources of the cloud environment. More specifically, a packet may be provided by a cloud environment that includes a first identifier associated with a resource of a destination network associated with a customer. At an ingress device of an intermediate network, a second identifier corresponding to a connection through the intermediate network may be inserted into the packet to facilitate routing along the connection. At an egress device of the intermediate network, the second identifier may be removed and the packet may then be routed according to the first identifier.

Figure 1:
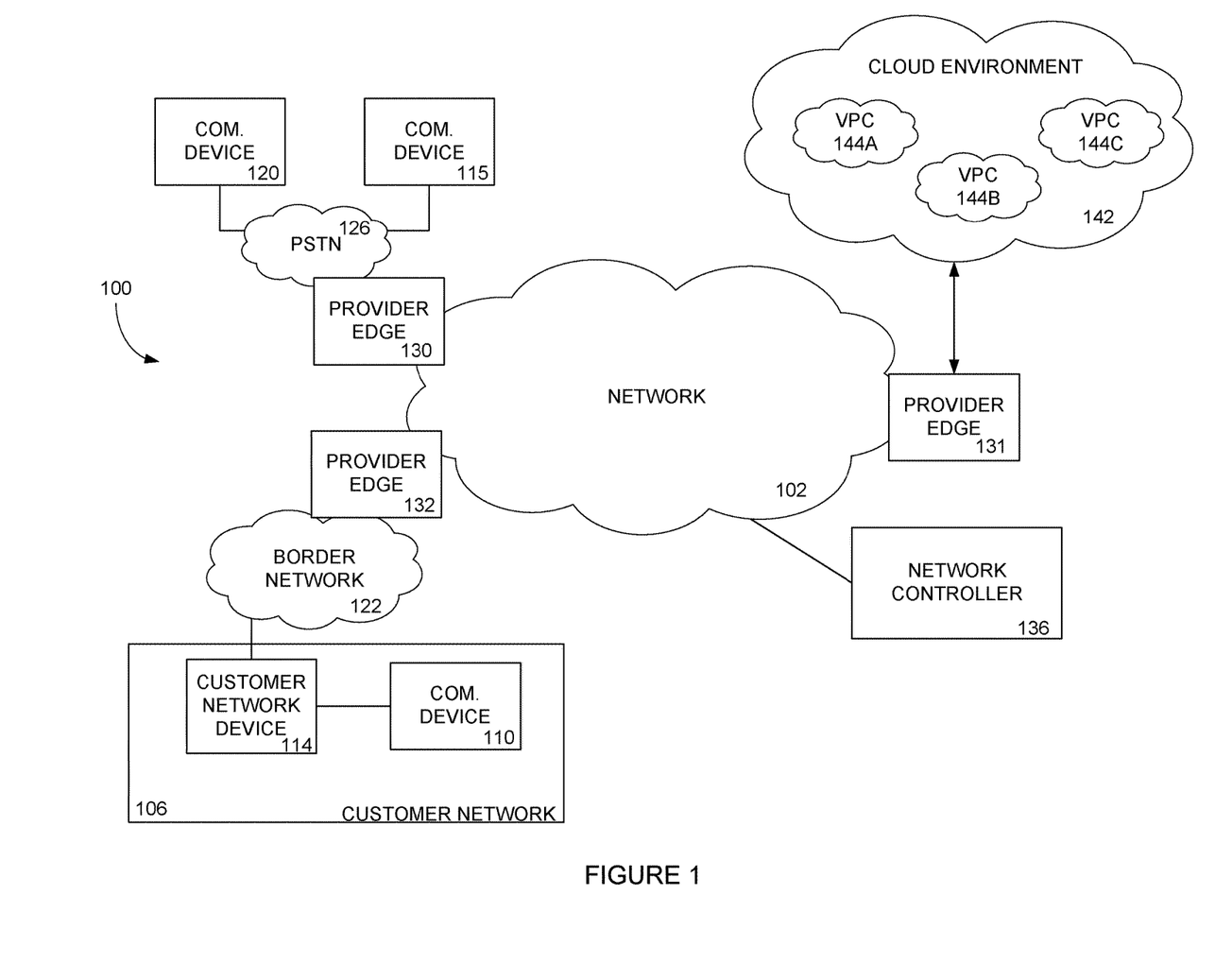
FIG. 1 is a schematic diagram illustrating an exemplary network environment in accordance with one implementation of the current disclosure.

Beginning with FIG. 1, one example of a telecommunications network configuration in accordance with the present disclosure is shown. In particular, FIG. 1 is a schematic diagram illustrating an exemplary network operating environment 100. In general, the network environment 100 provides for establishing communication sessions between network devices and for providing one or more network services. The environment 100 includes an intermediate network 102 (also referred to herein simply as "the network 102"), which may be provided by a wholesale network service provider. Portions of the intermediate network 102 may include either of IP-based or non IP-based routing. The intermediate network 102 may include devices utilizing time division multiplexing (TDM) or plain old telephone service (POTS) switching and suitable components or devices for converting TDM and/or POTS-based traffic to some form of IP-based traffic. The intermediate network 102 includes numerous components such as, but not limited to gateways, switches, and routers, which enable communication and/or provide services across the intermediate network 102, but are not shown or described in detail here because those skilled in the art will readily understand these components.

The intermediate network 102 may be configured to interconnect multiple secondary networks, such as customer network 106 which can include communication devices such as, but not limited to, a personal computer 110 connected to a customer network device 114, such as a router, firewall, gateway, switch, or other network device. Although shown in FIG. 1 as computer 110, the communication devices may include any type of communication device that receives a multimedia signal, such as an audio, video or web-based signal, and presents that signal for use by a user of the communication device. For example, a VoIP telephone or VoIP enabled device may be used to facilitate communication through the intermediate network 102 with the public switched telephone network (PSTN). The communication and networking components of the customer network 106 enable a user at the customer network 106 to communicate through the intermediate network 102 to other communication devices and/or networks, such as the PSTN 126, the Internet, a cloud network 142, and/or other customer networks. Components of the customer network 106 are typically home- or business-based, but they can be relocated and may be designed for easy portability. For example, the communication device 110 may be a wireless (e.g., cellular) telephone, smart phone, tablet or portable laptop computer. In some implementations, multiple communication devices in diverse locations that are owned or operated by a particular entity or customer may be connected through the intermediate network 102.

The customer network 106 typically connects to the intermediate network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the intermediate network 102 via a public switched telephone network (PSTN) 126 operated by a local exchange carrier (LEC). Communication via any of the networks can be wired, wireless, or any combination thereof. Additionally, the border network 122 and PSTN 126 and the border network 122 may communicate, in some implementations, with the network 102 through respective provider edges 130, 132. For ease of instruction, only three communication devices 110, 115, 120 are shown communicating with the network 102; however, numerous such devices, and other devices, may be connected with the intermediate network 102, which is equipped to handle enormous numbers of simultaneous communications.

An operator of the intermediate network 102 may configure the network 102 in any manner to facilitate the routing of communications through the network. For example, the intermediate network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network may receive route information through one or more route announcing sessions between the devices. These route announcing sessions provide Layer 3 routing information between the components of the network and between different networks so that components of the intermediate network 102 and other networks may determine how to route received communication packets.

One particular example of the announcement of Layer 3 routing information occurs in a Border Gateway Protocol (BGP) announcement. In general, BGP information (or BGP session, BGP feed or BGP data) involves a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, BGP information mainly describes routes used by the intermediate network 102 to connect to external networks or customers (such as border network 122 and virtual cloud environment 142) while IGP information describes routes through the network to connect one provider edge (such as provider edge 132) to another provider edge (such as provider edge 131) through the network 102.

The network 102 is provided as an example to illustrate various aspects of telecommunications relevant to the present disclosure. Implementations of the present disclosure are not limited to the specific implementation illustrated in FIG. 1. Rather, the concepts discussed herein are more generally applicable to systems for managing and configuring devices within telecommunications networks, such as the network 102.

In one instance, the network 102 may provide a connection between a customer network 106 and a cloud environment 142 such that the customer may request resources from the public cloud and access those resources through the network. In particular, a customer may purchase or otherwise acquire resources maintained in the cloud environment 142 to execute processes on the resources. Such resources are indicated in FIG. 1 as Virtual Private Clouds (VPCs) 144A-C. To utilize such resources 144A-C, the network 102 may provide a connection between devices of the customer network 106 (such as customer device 110) and the cloud environment 142. More particularly, one or more devices of the customer network 106 may connect to and provide/receive data and packets through provider edge 132, network 102, and provider edge 131. As explained in more detail below, the connection facilitated by the network 102 may be a connection over a public portion of the network 102 or a connection over a private or dedicated portion of the network. Regardless of the type or construct of the connection, the network 102 thus provides a communication path between the customer network 106 and the cloud environment 142 to facilitate the use of cloud resources 144A-C by the customer.

As illustrated in FIG. 1, the network environment 100 may further include a network controller 136 in communication with the network 102. The network controller 136 may perform various functions, including configuration of components of the network 102. For example, the network controller 136 may be accessible by an administrator or operator of the network 102 such that the administrator or operator may modify aspects of the network 102. Such modifications may include, without limitation, adding or removing components from the network 102, obtaining data from components of the network 102, configuring components of the network 102, and provisioning services over the network 102. In certain implementations, the network controller 136 may receive or otherwise function in response to data or requests provided by devices of the customer network 106. For example, and without limitation an administrator or other user associated with the customer network 106 may provide information regarding VPCs used by the customer and requests regarding how data exchanged between such VPCs and devices of the customer 106 should be handled by the network 102. In response to such information and requests, the network controller 136 may configure or otherwise modify aspects of the network 102 or components of the network 102 in accordance with the request such that data exchanged over the network 102 may be in accordance with the preferences provided by devices of the customer network 106. As further described below, such interaction between devices of the customer network in 106 and the network controller 136 may be facilitated, at least in part, by a portal or similar user interface accessible by an administrator or other user associated with the customer network 106. Although illustrated in FIG. 1 as being separate but communicatively coupled with the network 102, it should be appreciated that the network controller 136 may be implemented, in whole or in part, by one or more components of the network 102.

Figure 2:
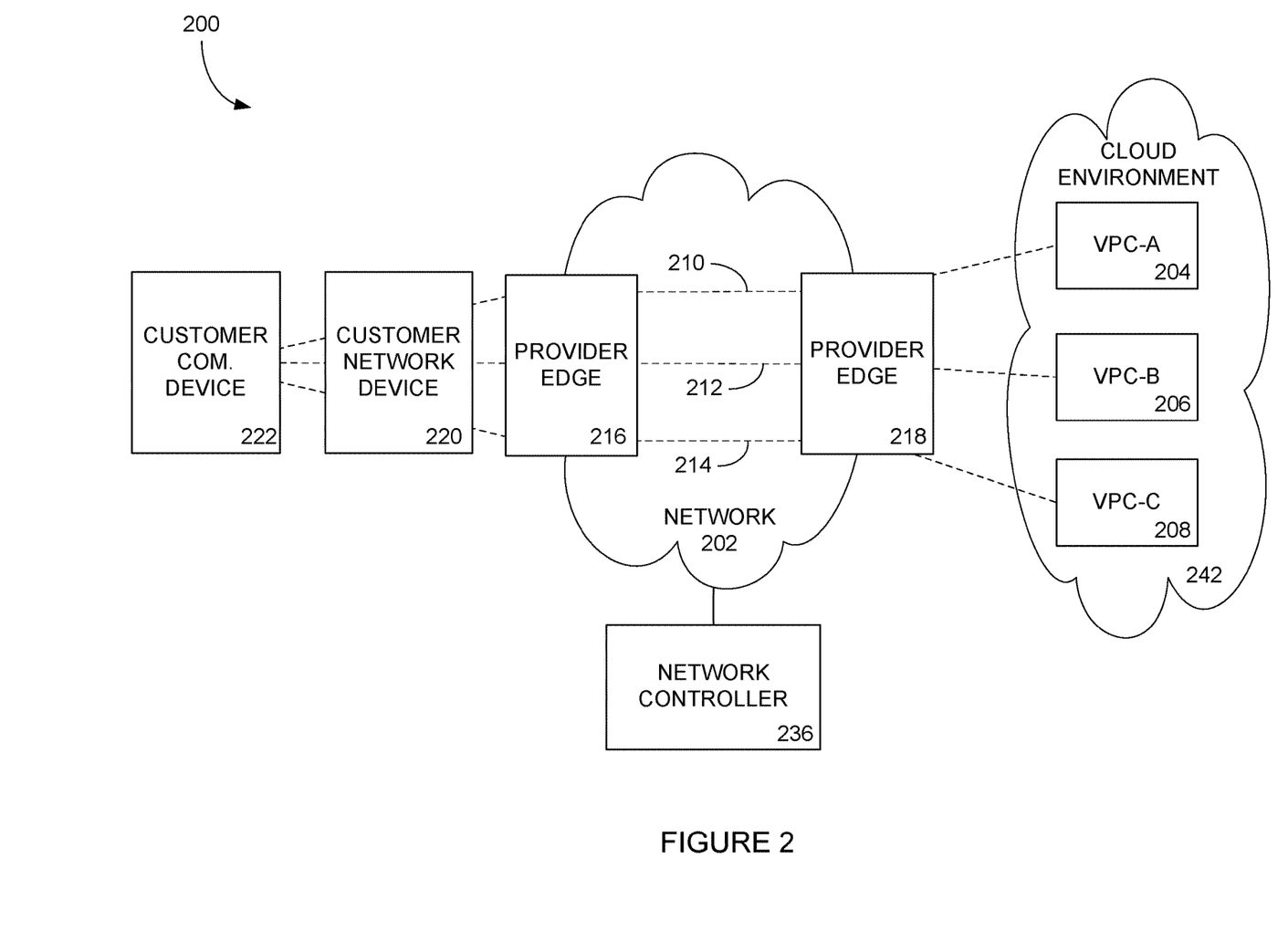
FIG. 2 is a schematic diagram illustrating a network environment for providing multiple Ethernet Virtual Connections (EVCs) between a computing system, such as a customer network, and multiple instances of a cloud environment through an intermediate network.

FIG. 2 is a schematic diagram illustrating a first network environment 200 for providing multiple EVCs 210-214 between a customer communication device 222, which may be part of a customer network and multiple VPCs 204-208 of a cloud environment 242 through an intermediate network 202. Many of the components of the network environment 200 are the same or similar to components in the network environment 100 of FIG. 1. For example, customer device 222 may be similar to the communication device 110 described above, as is network 202 similar to network 102 and virtual cloud environment 242 similar to virtual cloud environment 142. Further, provider edge 216 and provider edge 218 may be networking edge devices as also described above. Also, the network controller 236 may be similar to the network controller 136 of FIG. 1. More clearly shown in the network environment 200 of FIG. 2 are the connections formed through network 202 to facilitate communication between the customer communication device 222 and the virtual cloud environment 242.

The network environment 200 further includes a customer network device 220 disposed between the customer communication device 222 and the network 202. The customer network device 220 may be any suitable network device of a customer network or a border network for facilitating communication between the customer communication device 222 and the network 202. For example and without limitation, the customer network device 220 may include one or more of a modem, a router, a gateway, a switch, or any other suitable physical or logical network device.

As discussed above, a customer may purchase or otherwise utilize multiple cloud instances or VPCs 204-208 for the execution of the customer processes. The VPCs 204-208 may be utilized for a variety of reasons, such as security concerns, redundancy, performance metrics, and the like. For example, a first VPC (such as VPC-A 204) may be utilized by a customer for development of a project while a second VPC (such as VPC-B 206) may be utilized for testing of newly developed projects. The customer may desire to maintain the VPCs 204, 206 separately such that changes made within the development VPC do not change or otherwise affect the testing portion of the project. The separation of the VPCs 204-208 may be virtual within the cloud environment or may be physically separate on different physical resource devices. Regardless of the mechanism or technique to separate the VPCs 204-208 in the cloud environment 242, one or more customer communication devices, such as customer communication device 222 may be connected to multiple resources of the cloud environment through the network 202.

In the particular implementation of FIG. 2, a separate connection between the customer communication device 222 and each VPC 204-208 in the cloud environment 242 is provided over the network 202. In particular, the network controller 236 may create an individual EVC 210-214 through the network 202, each of which connects the customer communication device 222 to a respective one of the VPCs 204-208. The EVCs 210-214 provide an Ethernet tunnel through the network 202 between the customer communication device and the cloud environment 242. As should be appreciated, the multiple connections 210-214 between the customer communication device 222 and the VPCs 204-208 may include additional costs to set up for the network 202 and may be inefficient to provide the connection to the cloud services to the customer.

In a more particular example, a customer may desire to connect to three VPCs 204-208 established in the cloud environment 242 using the customer communication device 222. To do so, the customer may communicate with the cloud environment 242 (or an administrator of the cloud environment) to establish the parameters of the VPCs 204-208. Regardless of the method utilized to create or otherwise acquire the VPCs 204-208, a customer network device 220 may be configured to receive and route communications from the customer communication device 222 intended for the VPCs 204-208. For example, the customer network device 220 may be configured to identify packets or other communications that include CE-VLAN identifiers (or similar identifiers) associated with one of the VPCs 204-208 of the cloud environment 242 and to route such packets to the VPCs. A customer may also communicate with the network controller 236 to request connectivity to the VPCs 204-208 through the network 202. The network controller 236, in turn, may provision or configure network devices (such as provider edge 216 and provider edge 218) to create EVCs 210-214 for each VPC 204-208 associated with the customer communication device 222. The customer may also provide the CE-VLAN identifiers utilized by the customer for each VPC 204-208 such that components of the network 202 may be configured by the network controller 236 to route received communication packets to each VPC 204-208 using respective EVCs 210-214. In this manner, EVCs 210-214 are created through the network 202 to connect customer communication device 222 with the VPCs 204-208 of the cloud environment 242 associated with the customer.

For example, a customer may assign CE-VLAN identifier A with VPC-A 204 executing on cloud environment 242 and CE-VLAN identifier B with VPC-B 206. The customer may then provide CE-VLAN identifier A and CE-VLAN identifier B to the network controller 236, along with identifying VPC information. In response to the received information, the network controller 236 may determine that two EVCs 210, 212 are to be established through the network 202 to establish connects between the customer communication device 220 and the VPCs 204, 206. The network controller 236 may further determine which network devices (here, provider edge 216 and provider edge 218) are to be included in the EVCs 210, 212 and provision those devices to route packets that include CE-VLAN identifier A in the communication along EVC 210 and packets that include CE-VLAN identifier B along EVC 212. The network controller 236 may also determine which resources of cloud environment 242 are included in VPC-A 204 and VPC-B 206 so that packets may be routed from provider edge 218 to the correct VPC 204, 206 of the cloud environment 242. Further, through the exchange of routing information with components of the network 202 (and more particularly, provider edge 216), the customer network device 220 may be configured to route communication packets with CE-VLAN identifier A and CE-VLAN identifier B to provider edge 216 for inclusion along the EVCs 210, 212. In other implementations, the EVCs 210-214 may utilize different components of the network 202 such that communications with CE-VLAN identifier A may be routed to a first edge device of the network 202 while communications with CE-VLAN identifier B may be routed to a second edge device.

Although illustrated as separate connections 210-214 in the network 200 of FIG. 2, it should be appreciated that various configurations may be utilized in connecting the customer communication device 222 to the cloud environment 242. For example, the customer communication device 222 may connect to the network 202 through one or more communication ports, sometimes referred to as a User Network Interfaces (UNIs). Through a UNI, components of the network 202 receive communication packets intended for the cloud environment 242. In a similar manner, components of the network 202 may communicate with the cloud environment 242 through one or more communication ports. Further, an exchange of routing information, such as BGP information, may occur to allow components of the network 202 to transmit and receive packets from the customer communication device 222 and the cloud environment 242 at a Layer 3 communication level. Similarly, components of the network 202 may announce or exchange routing information (such as IGP information) within the network 202 to route communications between provider edges of the network, such as provider edges 216,218. In addition to the Layer 3 connection, components of the network 202 may establish a private Layer 2 connection between the customer communication device 222 and the cloud environment 242. Such Layer 2 connections, sometimes referred to as a Peer-To-Peer (P2P) connections, allow for secure communication of packets between the customer communication device 222 and each VPC 204-208 of the cloud environment 242.

Providing individual P2P connections between the customer communication device 222 and the cloud instances 204-208 may provide some benefits to the customer relating to security and reduced bandwidth requirements per tunnel. However, setting up individual communication tunnels through the network 202, such as illustrated by EVCs 210-214 of FIG. 2, requires significant time and coordination between the customer communication device 222, the customer network device 220, the network controller 236, and components of the network 202, with such requirements applying whenever a new VPC is created in the cloud environment 242. Further, establishing separate EVCs 210-214 may prevent a customer from utilizing all of the purchased bandwidth of the EVCs. For example, EVC 210 may connect the customer communication device 222 to a VPC-A 204, which may be predominantly used during daytime hours while EVC 212 may connect the customer to VPC-B 206, which may be predominantly utilized during nighttime hours. In such a scenario, EVC 210 may remain idle or substantially idle during nighttime hours while EVC 212 may be idle or substantially idle during daytime hours, such that only approximately 50% of the total bandwidth purchased by the customer to implement the EVCs 210,212 is used at any given time.

In contrast to implementing an EVC for each VPC, shared usage of an EVC for traffic associated with multiple VPCs may make more efficient use of bandwidth purchased or otherwise acquired by a customer. For example, in the previous example, the traffic intended for each of VPC-A 204 and VPC-B 206 may both be transmitted through the network 202 over EVC 210. Given the observed traffic patterns, EVC 210 would predominantly carry traffic for VPC-A 204 during the day and VPC-B 206 during the night. As a result, the total bandwidth and resources used to implement EVC 210 are more efficiently utilized than in the case where traffic for VPC-A 204 and VPC-B 206 are transmitted through separate EVCs. Such an implementation is now provided in more detail in the context of FIG. 3.

Figure 3:
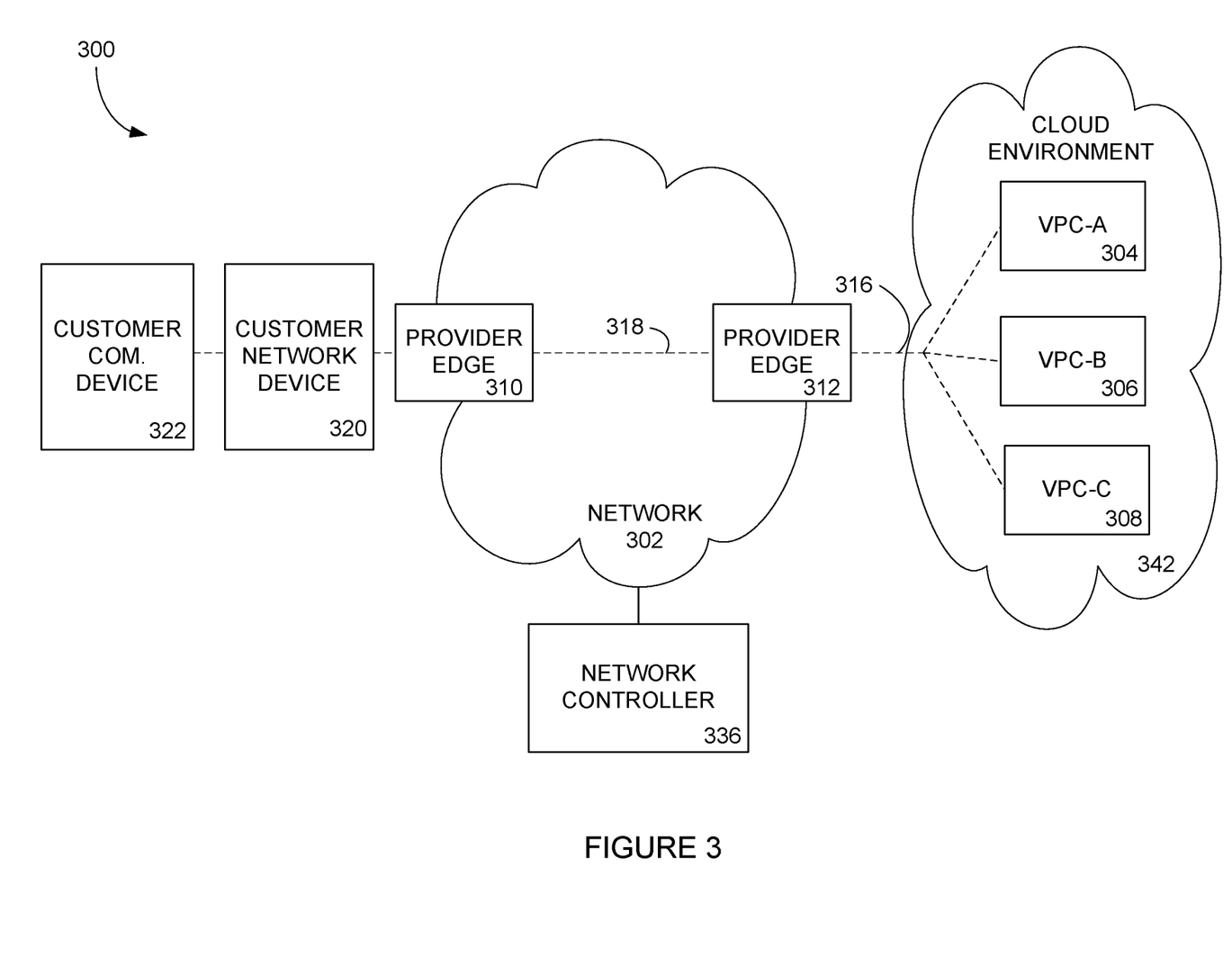
FIG. 3 is a schematic diagram illustrating a second network environment for providing an EVC between a computing system and multiple instances of a cloud environment through an intermediate telecommunications network.

FIG. 3 is a schematic diagram illustrating a second network environment 300 for providing connectivity between a customer communication device 322 and multiple VPCs 304-308 of a cloud environment 342 via an EVC 318 extending through a telecommunications network 302. Similar to the network configuration 200 of FIG. 2, the network environment 300 of FIG. 3 includes a customer communication device 322 connected to multiple VPCs 304-308 of a cloud environment 342 through the network 302 and a network controller 336 for facilitating functions of the network 302. However, in contrast to the network environment 200 of FIG. 2, in the network environment 300 of FIG. 3, the packets intended for the multiple VPCs 304-308 are transmitted to the cloud environment 342 over a single EVC 318.

In one particular implementation, the customer communication device 322 transmits all communications packets intended for the VPCs 304-308 along one communication path through customer network device 320, arriving at provider edge 310. Similar to the previous example, communication packets arriving at the provider edge 310 may include a CE-VLAN identifier (or similar identifier) associated with one of the VPCs 304-308 of the cloud environment 342, the CE-VLAN identifier corresponding to an intended destination of the packet. However, rather than transmit the packets along separate EVCs for each of the VPCs, as was the case in FIG. 2, all communication packets intended for VPCs 304-308 are instead transmitted through the network 302 along a single EVC 318 extending between provider edge 310 and provider edge 312.

In one implementation (described in more detail below), when the ingress provider edge 310 receives a packet to be transmitted over the EVC 318 to one of the VPCs 304-308, the ingress provider edge 310 may insert an identifier into the header of the packet. For example, the ingress provider edge 310 may insert a network-specific VLAN identifier (also referred to herein as a "Service Provider VLAN" (SP-VLAN) identifier) for routing of the packet through the network 302. Notably, the SP-VLAN identifier is inserted into the packet in addition to the CE-VLAN identifier of the packet identifying the particular destination VPC for the packet. The SP-VLAN identifier is then used by components of the network 302 to route the packet through the network 302 along the EVC 318 to an egress provider edge 312.

When the packet reaches the egress provider edge 312, the egress provider edge 312 may remove the SP-VLAN identifier from the packet. The egress provider edge 312 may then transmit the packet to the cloud environment 342 in accordance with the CE-VLAN identifier, which has been retained within the packet. The packet may then be routed to the appropriate VPC 304-308 by the cloud environment.

Figure 4:
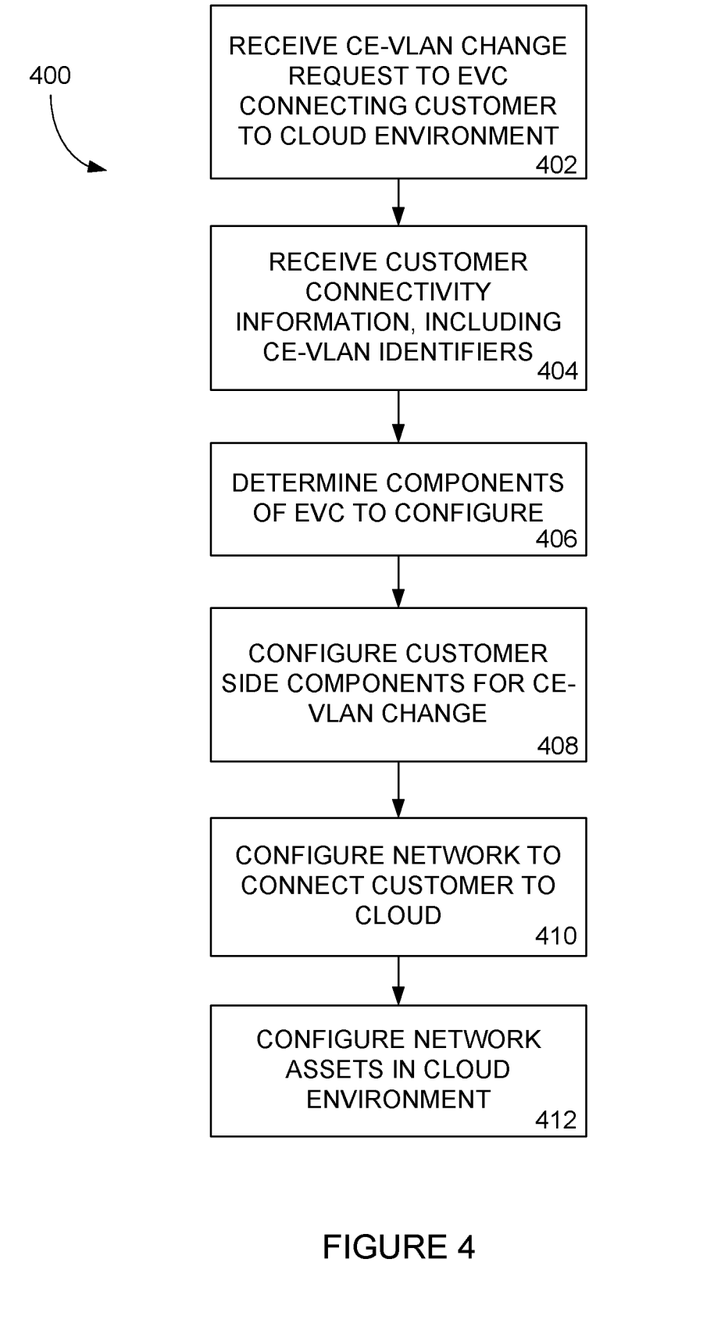
FIG. 4 is a flowchart illustrating a method for utilizing multiple Customer Edge Virtual Local Area Network (CE-VLAN) identifiers to deliver packets for multiple resources using an EVC.

With reference to FIG. 3, FIG. 4 is a flowchart illustrating a method 400 for facilitating communication between a customer communication device 322 and one or more VPCs 304-308 of a cloud environment 342 over a single connection 318. The operations of the method 400 may generally be executed by the network controller 336 and/or one or more components of the network 302 illustrated in FIG. 3. For example, the network controller 336 may dynamically connect and configure components of the network 302 to set up the connection 318 across the network 302 and to enable communication through the connection 318 once established.

In one instance, the customer may be provided access to the controller 336 (such as through a portal or similar interface) such that the customer may establish an EVC 318 and/or modify a list of CE-VLAN identifiers assigned to the EVC 318. The list of CE-VLAN identifiers may then be used to configure components of the network 302, such as the provider edge 310, to recognize packets having one of the CE-VLAN identifier. The provider edge 310 may modify any recognized packets, (e.g., by inserting a SP-VLAN identifier into the packet), such that the components of the network 302 route the packet through the network 302 using the EVC 318. Accordingly, to the extent the list of CE-VLAN identifiers includes multiple CE-VLAN identifiers assigned to the EVC 318, the method 400 facilitates communication between the customer communication device 322 and multiple VPCs over the EVC 318.

Beginning in operation 402, the network controller 336 may receive a change request from the customer regarding traffic, the change request for adding one or more CE-VLAN identifiers or deleting one or more existing CE-VLAN identifiers, each of the CE-VLAN identifiers associated with a respective VPC of the cloud environment 342. For example, a customer may have provision or purchased one or more VPCs 304-308 or other resources from a vendor or service provider of the cloud environment 342. As mentioned above, such resources 304-308 may be, among other things, data storage, compute resources, security resources, or any other virtual resource available from a virtual cloud environment. After acquiring a new resource, the customer may submit a request to the network controller 336 to add/assign a CE-VLAN identifier to an existing EVC 318 between the customer communication device 322 and the cloud environment 342 within which the new resource is located. If no EVC exists, the request may also trigger the creation of the EVC 318 between the customer communication device 322 and the cloud environment 342 through the network 302. At some later time, the customer may purchase an additional VPC from cloud environment 342 and associate a new unique CE-VLAN identifier with each of the new VPC and the EVC 318.

For purposes of the following example, it is assumed that VPC-C 308 of FIG. 3 is a new VPC obtained by the customer. It should be appreciated that any reference to the VPC 308 is intended merely as an example and the following example applies more generally to any resource of the cloud environment 342 that may be acquired by the customer.

After the new VPC 308 is obtained, the customer may request a communication connection to the cloud environment 342 to access the new VPC 308. In certain implementations, the customer may access a dynamic controller interface of the network controller 336 to request connectivity to the new VPC 308. The network controller 336 may, in turn, begin a process to provide communication between the customer communication device 322 and the VPC 308.

In operation 404, the customer provides connectivity information between the customer communication device 322 and the cloud environment 342, such as through the dynamic controller interface of the network controller 336. In particular, the customer 322 may provide, among other things, customer identification information, VPC identification and/or configuration information, information for an existing EVC (e.g., the EVC 318 of FIG. 3), a CE-VLAN identifier to be added to the EVC associated with the connection, and the like. In some instances, some of the above information may be provided through the exchange of Layer 3 routing information (such as through a BGP session) and Layer 2 transport information.

With the customer-cloud connectivity information received, the network controller 336 may then configure one or more devices of the network (and in particular, devices associated or included in the EVC 318) to connect the customer communication device 322 to the cloud environment 342 (operation 406). As part of the configuration process, the network controller 336 may determine which network devices are included in EVC 318. For example, the network controller 336 may determine that provider edge 310 and provider edge 312 are included in EVC 318. In some implementations, the devices identified as being included in EVC 318 may also include customer side components, such as customer network device 320, and cloud environment side components, such as devices associated with VPCs 304-308 or a cloud environment router (not shown).

In operation 408, the network controller 336 may begin configuring or provisioning the components included in EVC 318 with respect to the CE-VLAN identifier of the new VPC 308. For example, the network controller 336 may configure a customer router 320 to route packets with the particular CE-VLAN identifier to provider edge 310 of the network 302. In some instances, the network controller 336 may communicate with the customer network device 320 and instruct or otherwise configure the customer network device 320 to accept packets from the customer communication device 322 with the particular CE-VLAN identifier and route such packets to provider edge 310. In another example, provider edge 310 (or another network device) may announce BGP routing information that instructs the customer router 320 to provide packets intended for VPC 308 to the provider edge 310. Regardless of the implementation, the customer network device 320 is configured to route packets with the CE-VLAN identifier to provider edge 310, which functions as an ingress device for the network 302. Other packets with different CE-VLAN identifiers assigned by the customer may also be transmitted to the provider edge 310 for transmission along EVC 318 to cloud environment 342.

In operation 410, the network controller 336 may configure components of the network 302 to route received packets with the particular CE-VLAN identifier along EVC 318. In one particular implementation, the network controller 336 may establish, through shared IGP information, EVC 318 through the network 302 such that EVC 318 extends between provider edge 310 (connected to the customer network device 322) and provider edge 312 (connected to the cloud environment 342). To create EVC 318, the network controller 336 may also configure one or more of the components of the network 302 to receive and/or transmit packets that include different CE-VLAN identifiers associated with other VPCs or resources of the cloud environment 342.

In one implementation, the network 302 components of the EVC 318 may be configured to route packets through the network 302 based on a Service Provider Virtual Local Area Network (SP-VLAN) identifier. More particularly, SP-VLAN identifiers may be generated by or provided to the network controller 336 and uniquely associated with respective EVCs by the network controller 336 such that any packet including a given SP-VLAN identifier is routed through the network 302 using the EVC associated with the included SP-VLAN identifier. Notably, the SP-VLAN identifier may be included in addition to and independent of a CE-VLAN identifier that may also be included in the packet. As a result, the SP-VLAN identifier may be used to route communications through the network 302 and the CE-VLAN identifier may be used to ultimately direct such communications to the resource of the cloud environment 342 associated with the CE-VLAN.

As explained in more detail below, in certain implementations, the provider edge 310 may insert the SP-VLAN into a received packet while maintaining the CE-VLAN identifier within the packet. The components of the network 302 may then be configured to route a packet based on the SP-VLAN along EVC 318 to provider edge 312, where the SP-VLAN may be removed from the packet for transmission to cloud environment 342.

In operation 412, the network controller 336 may configure one or more assets of the cloud environment 342 associated with the network 302. For example, the network controller 336 may establish a connection 316 between the network 302 (more particularly the provider edge 312) and the cloud environment 342. In some instances, this may include requesting a communication port from the cloud environment 342 through which the provider edge 312 may provide communication packets or frames. As such, the network 302 may be assigned an identifier with which the cloud environment 342 may identify the network 302. In addition, Layer 3 information (such as BGP information) may be exchanged between components of the network 302 and the cloud environment 342 to establish a communication path 316 between the network 302 and the cloud environment 342. With the account information and BGP information, the cloud environment 342 may provide an open port to the provider edge 312 of the network 302 to receive communication packets intended for resources of the cloud environment 342.

In certain implementations, once a communication port is provided by the cloud environment 342 and a communication link 316 is established between the network 302 and the cloud environment 342, the network controller 336 may also configure the communication port of the cloud environment 342 to accept packets including CE-VLAN identifiers associated with the EVC 318 from the customer communication device 322. For example, the network controller 336 may call one or more Application Programming Interfaces (APIs) to communicate with and configure aspects of the cloud environment 342. Through the APIs, the network controller 336 may provide a list of CE-VLAN identifiers associated with the VPCs 304-308 utilized by the customer to the cloud environment 342. In certain implementations, the cloud environment 342 may also create a virtual interface associated with the communication port of the connection 316 to manage the receipt and transmission of packets on the path. This virtual interface may be provided with the CE-VLAN tag identifiers for use by the cloud environment 342 as explained below.

Through the method 400 of FIG. 4, the network controller 336 may add/assign a CE-VLAN identifier associated with a VPC-C 308 to an EVC 318 extending through the network 302. The EVC 318 may be associated with other CE-VLAN identifiers associated with other VPCs (e.g., VPC-A 304 and VPC-B 306) of the cloud environment 342 such that the customer may utilize the single EVC 318 to carry packets intended for any of VPCs 304-308. In other words, packets including any of the CE-VLAN identifiers are transmitted in a single stream over a single communication path or route through the network 302, regardless of their ultimate destination. The cloud environment 342 may then be configured to recognize or determine the CE-VLAN identifiers included in each of the received packets and provide the packets to the intended VPC. In this manner, communications between the customer and multiple VPCs 304-308 are multiplexed into a single stream of packets that can be transmitted on a single EVC 318 or path through the network.

Several advantages may be realized for the customer and/or the network 302 through the use of VLAN separation as included in implementations of the present disclosure. For example, a single route through the network 302 may be easier to manage for the customer by consolidating several secure routes or tunnels through the network 302 into a single route and applying global routing features to the route. Further, creating or setting up the routes between the customer communication device 322 and the cloud environment 342 may occur faster (due to the fewer number of components to be configured) and, in some instances, may be created dynamically in response to a request by the customer. For example, the customer may be provided with a mechanism or system to dynamically request a connection to the cloud environment 342 or a cloud instance 304 by providing the routing and connectivity information to a network controller 336. The network controller 336 may then automatically configure ports of components of the network 302 to define a communication path through the network 302. The network controller 336 may also execute one or more operations (such as through an API) related to controllable aspects of the cloud environment 342 to create the communication path. Tearing down a route to the cloud environment 342 may also occur dynamically in a similar manner. In addition, fewer routes provided to the customer by the network 302 may provide the network with more resources and devices to provide services to other customers. Thus, by utilizing CE-VLAN tags to separate packets intended for multiple VPCs 304-308, the network 302 may operate more efficiently and provide the customer with improved service when interacting with the cloud environment 342.

Figure 5:
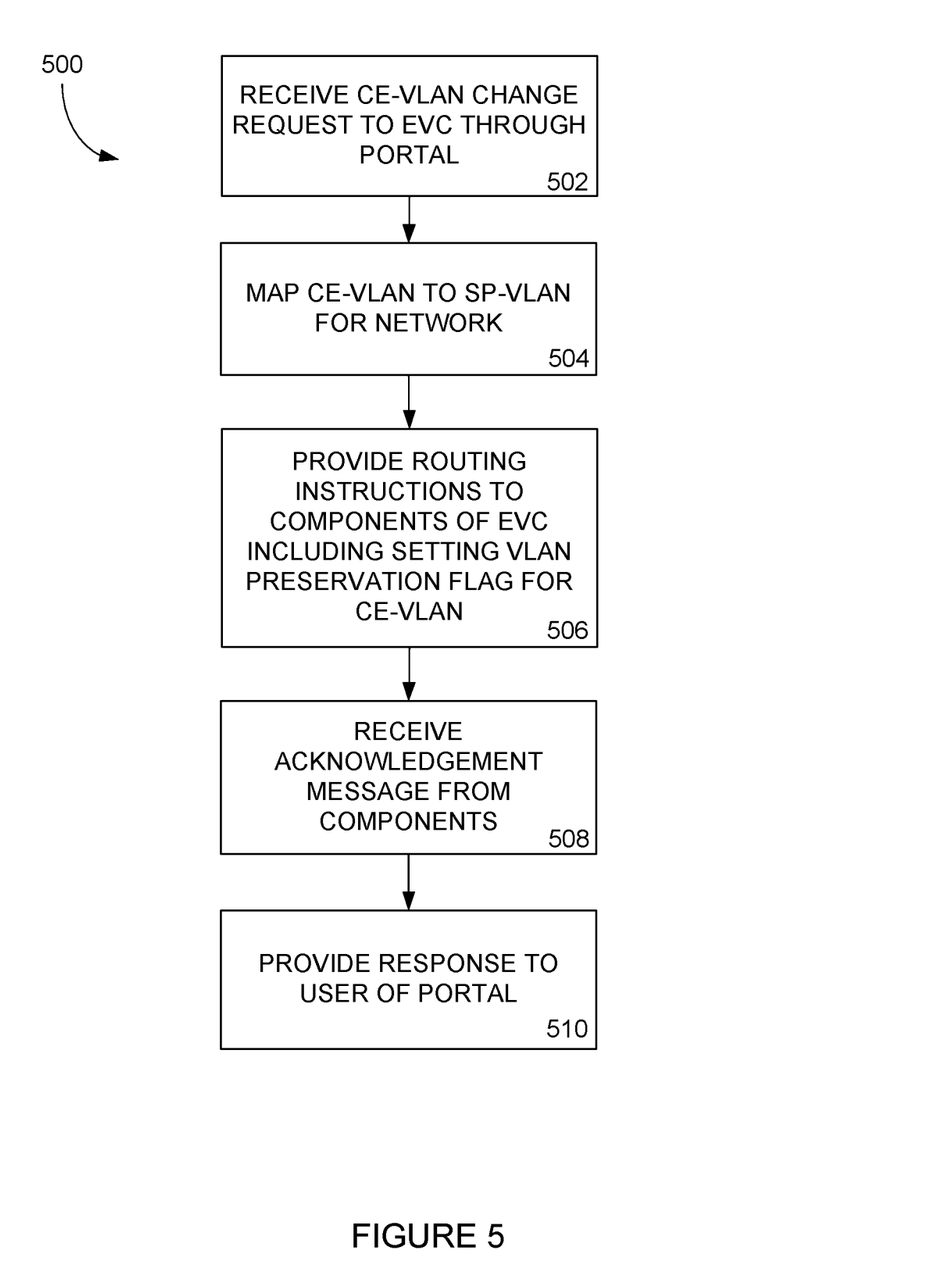
FIG. 5 is a flowchart illustrating a method for configuring one or more components of an EVC to route multiple CE-VLAN identifiers through a network.

FIG. 5 is a flowchart illustrating a method 500 for configuring one or more components of an EVC 318 of a network 302 to route multiple CE-VLAN identifiers to a cloud environment 342. In one implementation, the operations of the method 500 may be performed by the network controller 336 of FIG. 3. In other implementations, one or more of the operations may be performed by other network components including components of the network 302 or a network associated with the customer (such as customer network 106 or border network 122 illustrated in FIG. 1). Beginning in operation 502, the network controller 336 receives a request to add a CE-VLAN identifier to an EVC 318 of a customer, the EVC 318 extending through the network 302. In one implementation, the request is received through a customer portal or similar user interface in communication with the network controller 336. As also explained above, the request may include identifying information, including but not limited to a customer identifier, an EVC identifier, a CE-VLAN identifier, and the like.

In operation 504, the network controller 336 may map the received CE-VLAN identifier to an SP-VLAN identifier that is uniquely associated with the EVC 318. This mapping may also be stored in one or more databases accessible by the network controller 336 for future use in configuring the network 302. In operation 506, the network controller 336 provides one or more routing instructions or tables to components of the network 302 defining included in the EVC 318 to route packets with including the CE-VLAN identifier along the EVC 318. In one implementation, the components may be configured to identify the SP-VLAN identifier of a packet and route the packet based on the SP-VLAN identifier through the network 302, such routing being along the EVC 318. Further, the instructions provided by the network controller 336 may include instructions to set a VLAN preservation flag to retain the CE-VLAN identifier of the packet throughout routing along the EVC 318. Thus, although the network 302 may utilize the SP-VLAN identifier to route the packet within the network 302, the CE-VLAN identifier is maintained within the packet for later routing use upon egress from the network 302 (e.g., routing within the cloud environment 342).

In operation 508, the network controller 336 may receive an acknowledgement message from the components of the EVC 318 that the routing instructions have been received and executed. As noted in operation 510, this acknowledgement message may, in some instances, be provided to the customer through a portal or user interface. In this manner, the customer may utilize the portal or interface to add a CE-VLAN identifier to an EVC 318 of the network 302.

Figure 6:
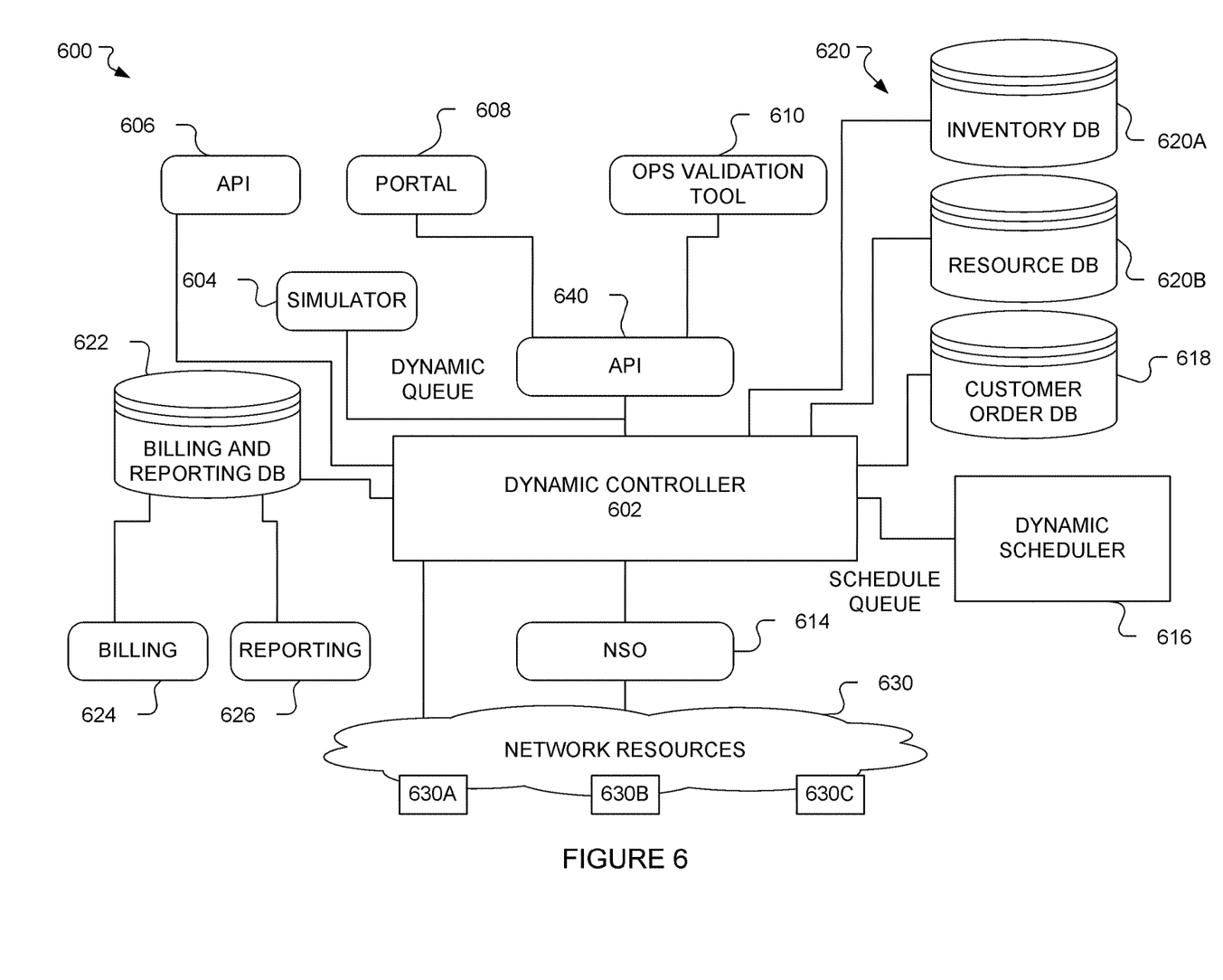
FIG. 6 is a schematic diagram of an exemplary system to manage requests for network services and to provide dynamic connections in a network.

FIG. 6 is a schematic diagram of an exemplary system 600 to manage requests from a customer for network services and to provide dynamic connections in a network in response to such requests. As illustrated in FIG. 6, the system 600 may include a dynamic controller 602, which, in certain implementations, may generally correspond to the network controller 336 previously discussed in the context of FIG. 3. Through the dynamic controller 602, a customer may request to initiate or cease routing of packets including particular CE-VLAN identifiers along an existing EVC 318 through the network 302. Thus, a dynamic controller 602 is shown for use by a customer to manage functionality for building network paths, which may include EVCs 318 or other connections. While not being limited to any particular programming language, the dynamic controller 602 may include a multi-threaded, high-performance, high-reliability, and real-time application that services connection requests either from a portal 608 (such as a customer portal/web interface or application) or directly from calls using an application programming interface (API) 606. The dynamic controller 602 is in communication with or otherwise has access to information about network resources 630, such as network resource 630A, network resource 630B, and network resource 630C. Such network resources 630, which may also be referred to as network elements, may include switches, routers, or other such networking resources associated with an intermediate network, metro ring networks, or other networks that form or are otherwise associated with a service provider network, such as the network 302 of FIG. 3, and may be involved in providing Layer 2 interconnectivity in the network.

The dynamic controller 602 is further connected to or otherwise has access to one or more databases 620. In general, the databases 620 may include data that may be accessed and used by the dynamic controller 602 when executing various functions, such as establishing connections through a telecommunications network. In one implementation, the databases 620 include an inventory database (DB) 620A which may contain information about the topology of the network resources 630, the various types of each network resource 630, how the network resources 630 are commonly used for a network connection (e.g., how the resource is positioned hierarchically within a connection path), and how the network resources 630 are physically interconnected, or other information that may be useful for establishing a connection through a network. As such, the inventory database 620A may be referenced by the dynamic controller 602 to generate the path, including the order of devices in a connection path. For example, the inventory database 620A may contain information indicating that the network resource 630A is a switch utilized with a metro ring accessible by a particular customer device. The resource database 620B may contain or have access to information about port/interface availability for each of the network resources 630, configuration attributes needed to configure interfaces for each of the network resources 630, and the like. For example, the resource database 620B may contain information indicating that the network resource 630A has an available port P1, and that configuration attributes X, Y, and Z are needed to configure the network resource 630A for a given network connection. During operation, the dynamic controller 602 may communicate with and update the information stored within the databases 620 as the dynamic controller 602 is building, modifying, or tearing down various network connections, as described herein.

The dynamic controller 602 may further have access to a billing and reporting database 622 that may further be coupled to or otherwise include data associated with a billing module 624 and a reporting module 626 to facilitate billing- and reporting-related functions. The dynamic controller 602 may also be connected or otherwise have access to a customer order database 618 to track orders and connections requested by customers. Information in either of the billing and reporting database 622 and the customer order database 618 may be used by the dynamic controller 602 to build network connection paths or otherwise configure devices of the connection paths. It should be understood that the depicted databases are merely exemplary and that additional databases or storage repositories are contemplated. In some implementations, the information from the databases 620, the customer order database 618, and the billing and reporting database 622 may be aggregated for use by the dynamic controller 602.

The dynamic controller 602 may be in communication with any number of different devices, applications, modules, systems or components to execute the functionality described herein. For example, the dynamic controller 602 may utilize a simulator 604, comprising an application or system operable to simulate a network connection path. The dynamic controller 602 may utilize a second API 640 to provide real-time measurement within a network. Such measurements may then be used by the dynamic controller 602 to determine whether any of the network resources 630 has bandwidth for a new interface configuration or to otherwise provide statistics about the network resources 630. The dynamic controller 602 may also provide access to an operations (OPS) validation tool 610 to troubleshoot network connections and connection paths, and may utilize a dynamic scheduler 616 to manage requests for connections received via the portal 608 and API 606.

As further shown in FIG. 6, the dynamic controller 602 may be connected to a network service orchestration (NSO) system 614 and the NSO system 614 may further be in communication with the network resources 630. As described herein, the dynamic controller 602 retrieves or accesses device configuration attributes that are needed to configure devices for a connection path and makes such configuration attributes available to the NSO system 614. The NSO system 614 may include any configuration system and/or one or more computing and network devices which are operable to provision a network connection by applying or otherwise implementing configurations defined by the device configuration attributes to any one of the network resources 630.

Figure 7:
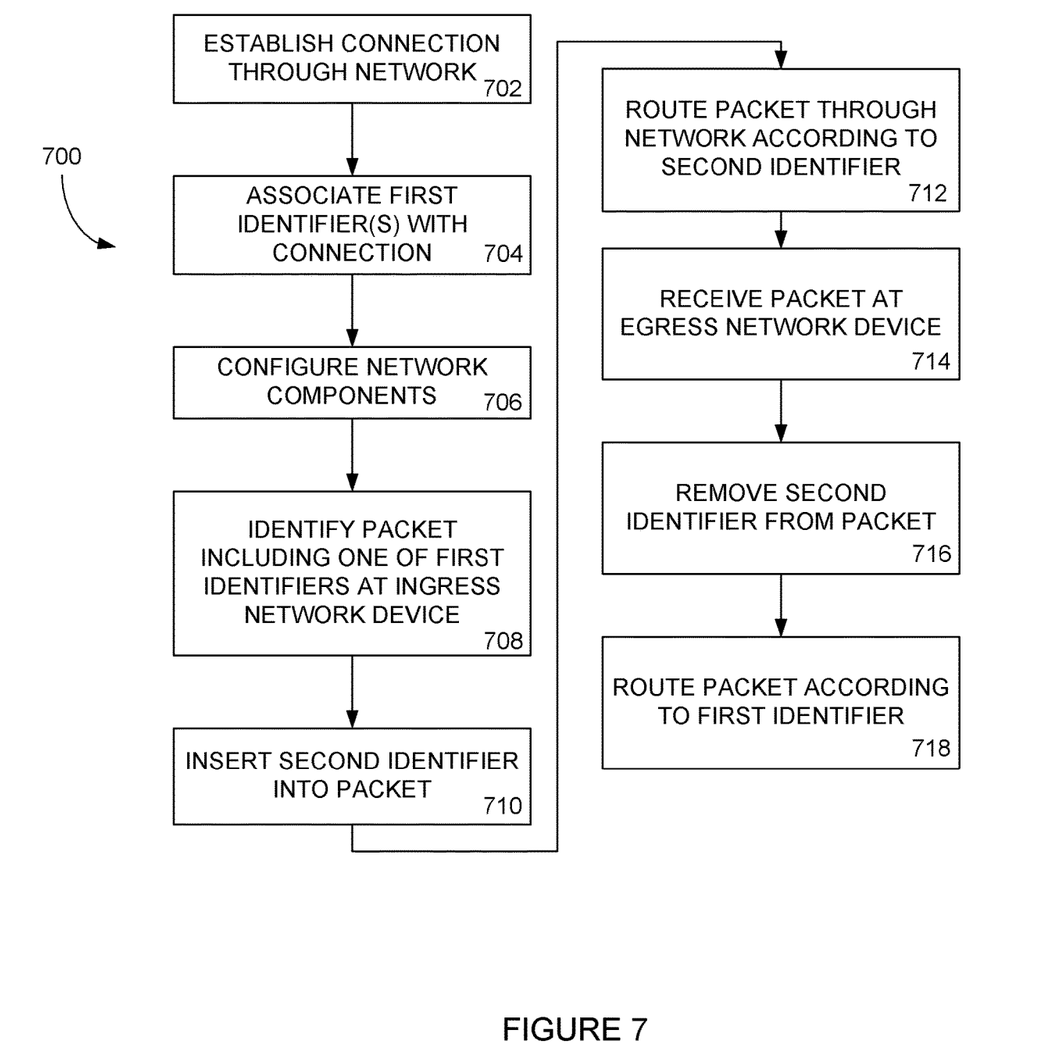
FIG. 7 is a flow chart illustrating an example method for communicating between computing systems.

FIG. 7 is a flow chart illustrating an example method 700 for communicating across a network according to the present disclosure. More particularly, the method 700 includes establishing a connection between a first computing system or network and a second computing system or network and transmitting traffic for multiple resources of the second computing system or network using the connection. With reference to FIG. 3, for example, the first computing system or network may correspond to the customer communication device 322, the customer network device 320, or one or more networks including such devices, the second computing system or network may correspond to the cloud computing environment 342, and the intermediate network may correspond to the network 302. However, it should be appreciated that the first computing system or network may be any suitable system or network capable of connecting to the second computing system or network through the intermediate network and the second computing system or network may be any system or network including multiple resources. For example, in one implementation, the first system or network may instead be the cloud computing environment 342 and a customer network including multiple resources may be the second system or network.

At operation 702, a connection is established between the first system and the second system. As previously discussed in the context of FIG. 3, such a connection may be, among other things, an EVC 318 extending from the customer communication device 322, through the network 302, to the cloud environment 342. Establishing the connection may include a network controller, such as the network controller 336, configuring one or more network devices of the intermediate network to provision the connection. For example, the network controller may configure at least a first edge device in communication with the first system/network (e.g., provider edge 310) and a second edge device in communication with the second system/network (e.g., provider edge 312) to route traffic between the first and second systems/networks along the connection. In addition to the edge devices, other devices of the intermediate network that are physically and/or logically disposed along the network path corresponding to the connection may also be configured by the network controller to route traffic along the connection.

After a connection is established between the first and second systems/networks through the intermediate network, one or more first identifiers may be associated with the connection (operation 704), with each of the first identifiers may be assigned to a resource of the second system/network. As previously discussed, in one implementation the first identifiers may be CE-VLAN identifiers such that each resource of the second system/network is assigned a unique CE-VLAN identifier. One or more of the CE-VLAN identifiers may then be associated with the connection through the intermediate network such that any packets including the CE-VLAN identifiers associated with the connection may be identified and routed through the intermediate network using the connection.

In one implementation, association of identifiers to connections may be facilitated by a portal or similar interface accessible by an administrator or other use associated with the first system/network. Through such an interface, the user may provide information regarding any cloud-based resources associated with the first system/network and select through which connection communication with such resources should occur.

In response to a first identifier being associated with the connection, the network controller may automatically communicate with and configure one or more components of the intermediate network (operation 706) such that the one or more components may identify any packets including the first identifier (operation 708). For example, referring to FIG. 3, the network controller 336 may configure the provider edge 310 or other ingress device of the network 302 to identify packets received from the customer communication device 322 that include a CE-VLAN identifier associated with the EVC 318. After configuration, the provider edge 310 may identify a packet including a CE-VLAN identifier associated with the EVC 318.

In response, identifying a packet including the first identifier, the ingress device may insert a second identifier associated with the connection (operation 710). As a result, the packet may include each of the first identifier associated with a destination resource and a second identifier associated with a connection over which the packet is to be transmitted. As previously discussed, in one example implementation, one example of a second identifier may be a SP-VLAN identifier. After inserting the second identifier, the ingress device may begin routing the packet through the intermediate network according to the second identifier (operation 712).

During the configuration operation 706, the network controller may also configure one or more additional components of the intermediate network to facilitate communication using the connection. For example, one or more devices within the intermediate network may be configured to identify packets including the second identifier and to route packets including the second identifier along a network path corresponding to the connection.

The network controller may further configure an egress device of the intermediate network during operation 706. More specifically, the network controller may configure such an egress device to identify packets including the second identifier, remove the second identifier from such packets (operation 714) and then route the packets (now including only the first identifier) according to the first identifier). In the example of FIG. 3, such an egress device may be the provider edge 312. When configured by the network controller as described above, the provider edge 312 may identify subsequently received packets including the SP-VLAN identifier and, when such a packet is identified, may remove the SP-VLAN identifier from the packet. The provider edge 312 may then forward the packet to the cloud environment 342 according to the CE-VLAN identifier remaining in the packet.

Figure 8:
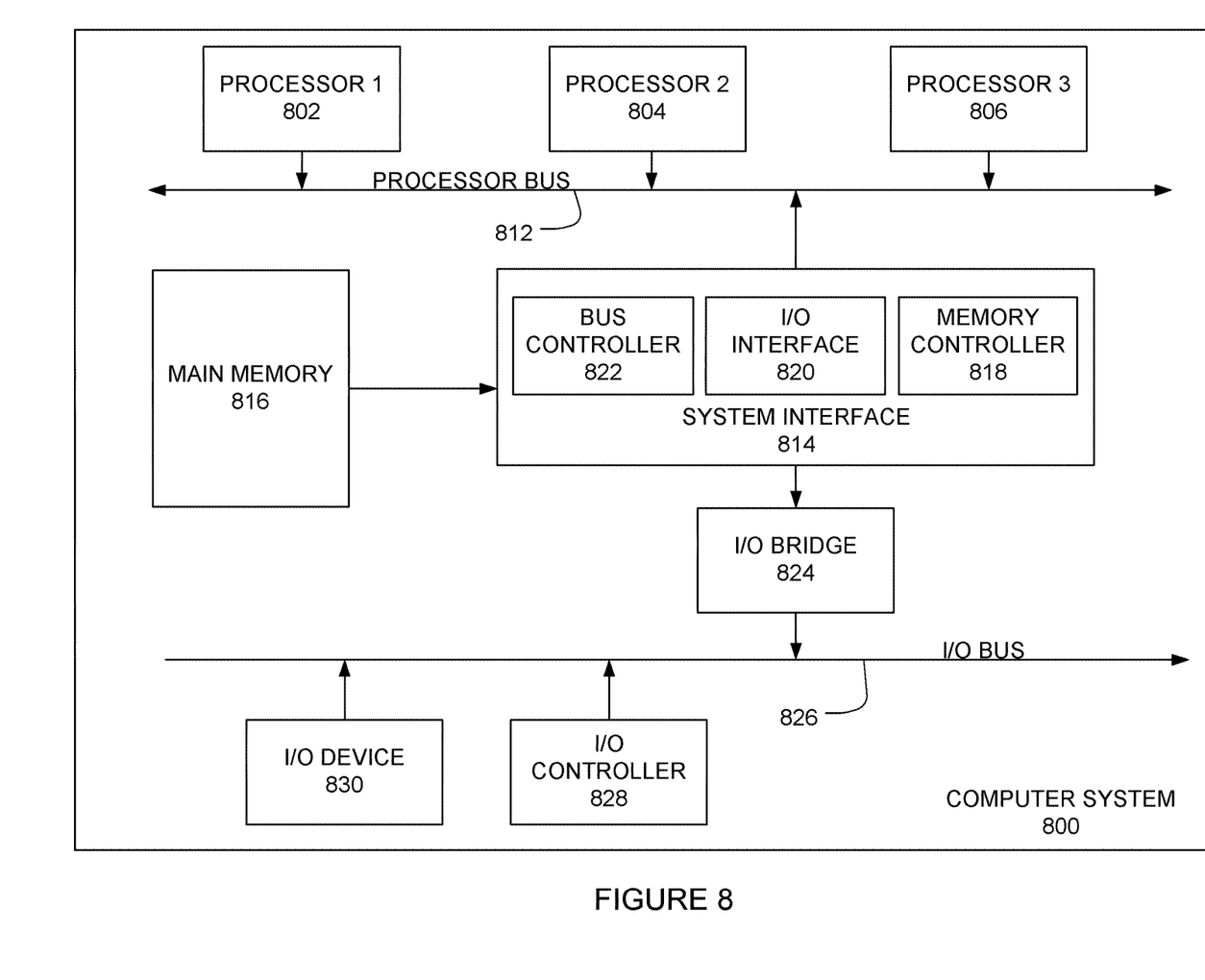
FIG. 8 is a diagram illustrating an example of a computing system which may be used in implementations of the present disclosure.

FIG. 8 is a block diagram illustrating an example of a computing device or computer system 800 which may be used in implementations of the components of the network disclosed above. For example, the computing system 800 of FIG. 8 may be the dynamic controller 602 discussed above. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated. The system interface 814 may further include a bus controller 822 to interact with processor bus 812 and/or I/O bus 826.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one implementation, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative implementations, circuitry may be used in place of or in combination with the software instructions. Thus, implementations of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Implementations of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for transmitting one or more packets over networks, the method comprising:
    associating a plurality of Customer Edge Virtual Local Area Network (CE-VLAN) identifiers with an Ethernet Virtual Connection (EVC), wherein:
        each of the plurality of CE-VLAN identifiers identify a Customer Edge device;
        each of the plurality of CE-VLAN identifiers is assigned to a respective Virtual Private Cloud (VPC) of a cloud computing environment; and
        the EVC extends between a first network and the cloud computing environment through a second network and is configured to transmit packets including any of the plurality of CE-VLAN identifiers to the cloud computing environment; and
    including a Service Provider Virtual Local Area Network (SP-VLAN) identifier, wherein the SP-VLAN identifier is used for routing a packet of the one or more packets through the second network; and
    transmitting the packet received from the first network and including a CE-VLAN identifier of the plurality of CE-VLAN identifiers to the cloud computing environment using the EVC.

2. The method of claim 1, further comprising:
    receiving the packet from the first network at an ingress device of the second network; and
    inserting, at the ingress device, the SP-VLAN identifier into the packet,
    wherein the packet is routed through the second network based, at least in part, on the SP-VLAN identifier.

3. The method of claim 1, wherein the method further comprising removing the SP-VLAN identifier from the packet at an egress device of the second network.

4. The method of claim 1, wherein the packet is a first packet and the CE-VLAN identifier is a first CE-VLAN identifier of the plurality of CE-VLAN identifiers, the method further comprising transmitting a second packet received from the first network and including a second CE-VLAN identifier of the plurality of CE-VLAN identifiers to the cloud computing environment using the EVC, the second CE-VLAN identifier being different than the first CE-VLAN identifier.

5. The method of claim 1, wherein associating the plurality of CE-VLAN identifiers with the EVC includes receiving a reconfiguration command, the reconfiguration command including a new CE-VLAN identifier to be associated with the EVC.

6. The method of claim 5, further comprising reconfiguring an ingress device of the second network to identify packets including the new CE-VLAN identifier and to insert the SP-VLAN identifier into identified packets, the SP-VLAN identifier selected to facilitate routing through the second network along the EVC.

7. The method of claim 6, wherein identifying packets including the new CE-VLAN identifier further comprises determining a preservation flag of the packet has been set by a device of the first network.

* * * * *